United States Patent [19]

Young et al.

[11] Patent Number: 4,639,738

[45] Date of Patent: Jan. 27, 1987

[54] INK LEVEL DETECTION SYSTEM FOR INK JET PRINTING APPARATUS

[75] Inventors: Lawrence R. Young, West Lebanon, N.H.; Gregory J. Sexton, Dayton, Ohio; Randal L. Mullins, Xenia, Ohio; Brian D. Bradley, Beavercreek, Ohio

[73] Assignee: Eastman Kodak Company, Rochester, N.Y.

[21] Appl. No.: 722,549

[22] Filed: Apr. 12, 1985

[51] Int. Cl.[4] ...................... G01D 15/18; G01F 23/18

[52] U.S. Cl. ................................ 346/75; 346/140 R; 73/301; 73/302

[58] Field of Search ............... 346/75, 140 R; 73/301, 73/302

[56] References Cited

U.S. PATENT DOCUMENTS 4,006,635 2/1977 Khoi .................................... 73/302

*Primary Examiner*—E. A. Goldberg
*Assistant Examiner*—Gerald E. Preston
*Attorney, Agent, or Firm*—John D. Husser

[57] ABSTRACT

The detection system includes a cartridge having a first detection port for detecting the pressure condition in the top portion of the cartridge and a second detection port and tube for detecting the pressure condition in a bottom portion of the cartridge. The cooperative printer structure couples these ports to a pressure differential sensor that signals a printer refill condition.

5 Claims, 11 Drawing Figures

INK LEVEL DETECTION SYSTEM FOR INK JET PRINTING APPARATUS

BACKGROUND OF THE INVENTION

1. Field of the Invention

The present invention relates to ink jet printing apparatus and more particularly to improved systems for detecting the level of remaining ink in the supply reservoir of such apparatus.

2. Description of Background Art

In continuous ink jet printing apparatus streams of uniformly spaced ink drops are created by imposing predetermined vibrations upon liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets which are intercepted by a catcher for recirculation. Often the print head cavity has an outlet other than the orifice plate (e.g. to facilitate dynamic pressure control within the cavity at start-up), and the apparatus ink supply system also circulates such ink flow.

In such apparatus, it is highly desirable to detect that the ink supply is at a "replenish-condition" prior to the time that the ink supply becomes insufficient to achieve proper printing operation. Failure to provide such detection could cause spoilage of a considerable amount of print output if the problem is not visually detected. Also operation in such a low ink condition could necessitate a lengthy restart cycle, e.g. in order to remove air from the system, or could even cause machine damage.

Various physical approaches and devices have been used in the prior art to detect ink level in the ink supply reservoir. For example electrical probes or other such detectors can be introduced into the reservoir at a selected level to detect the existence or non-existence of the ink. This approach and other such sophisticated electrical detection schemes are highly useful in systems where the ink reservoir is an integral portion of the printer apparatus.

However, such approach is not so desirable in all applications. As described in U.S. application Ser. No. 722,548, entitled "Ink Cartridge and Cooperative Continuous Jet Printing Apparatus", filed Apr. 12, 1986, in the name of J. McCann, it is desirable that office-use printers have a readily replaceable ink cartridge. That application describes a highly advantageous system wherein a removable cartridge cooperates, with the fluid conduits of a continuous ink jet printer, as the supply/return reservoir for ink circulation. In such a system it is highly desirable that minimum complexity and cost be built into the replaceable ink cartridge.

SUMMARY OF THE INVENTION

Thus, one significant objective of the present invention is to provide an effective system for detecting the ink level within an enclosed cartridge, wherein a minimum of additional complexity is burdened upon the cartridge construction. In one aspect the present invention provides a simple ink-cartridge for accomplishing this general objective. In another aspect the present invention provides in ink jet printing apparatus, a construction for cooperating with such a cartridge to perform reliable ink level detection.

In one preferred embodiment according to its apparatus aspect, the present invention provides for continuous ink jet printing apparatus of the kind adapted for using a cartridge for an ink supply/return reservoir, an improved construction for detection of ink level comprising means for sensing and signalling a predetermined pressure difference between first and second pressure regions; first conduit means connectible to a first port of such cartridge for transmitting a representation of the pressure within an upper, evacuated cartridge region to said sensing means; and second conduit means connectible to the upper port of a cartridge conduit for transmitting a representation of the pressure at a lower port of such cartridge conduit, said second conduit means being coupled to atmospheric pressure via a flow restrictor.

In one preferred embodiment according to its cartridge aspect, the present invention provides in an ink cartridge of the type that is adapted for use with continuous ink jet printing apparatus and that includes: (i) top, bottom and side wall means defining an ink reservoir and (ii) ink-outlet and ink-return ports in said top wall means, an improved ink level detection construction, comprising vacuum port means, adapted for coupling to a vacuum source of such apparatus, for providing a negative pressure in said cartridge; first detection port means for coupling an upper region of said cartridge to a pressure differential detector of such apparatus; and second detection port and cartridge conduit means for coupling a region proximate the bottom of said cartridge to such pressure differential detector.

In a further aspect the present invention constitutes the combination of such cartridge and apparatus as they cooperate to provide a reliable, yet structurally simple, ink level detection function.

BRIEF DESCRIPTION OF THE DRAWINGS

The subsequent description of preferred embodiments of the invention refers to the attached drawings wherein.

DETAILED DESCRIPTION OF THE PREFERRED EMBODIMENTS

Figure 1:
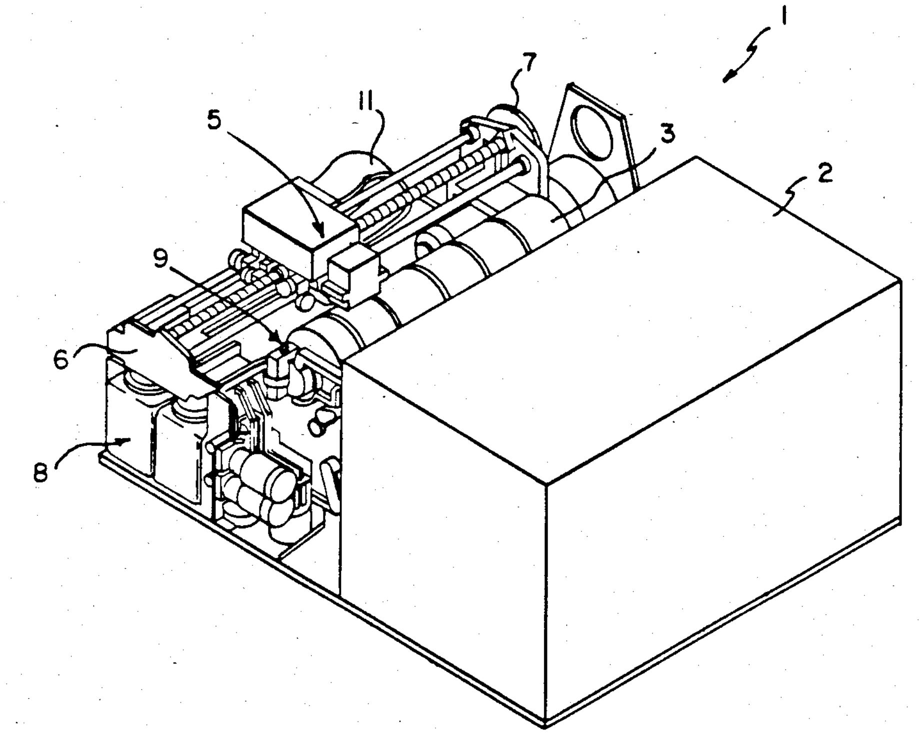
FIG. 1 is a perspective view of one continuous ink jet printing apparatus with which the present invention is useful.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute an essential part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits which are coupled to ink supply cartridges 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the apparatus cycle.

Figure 2:
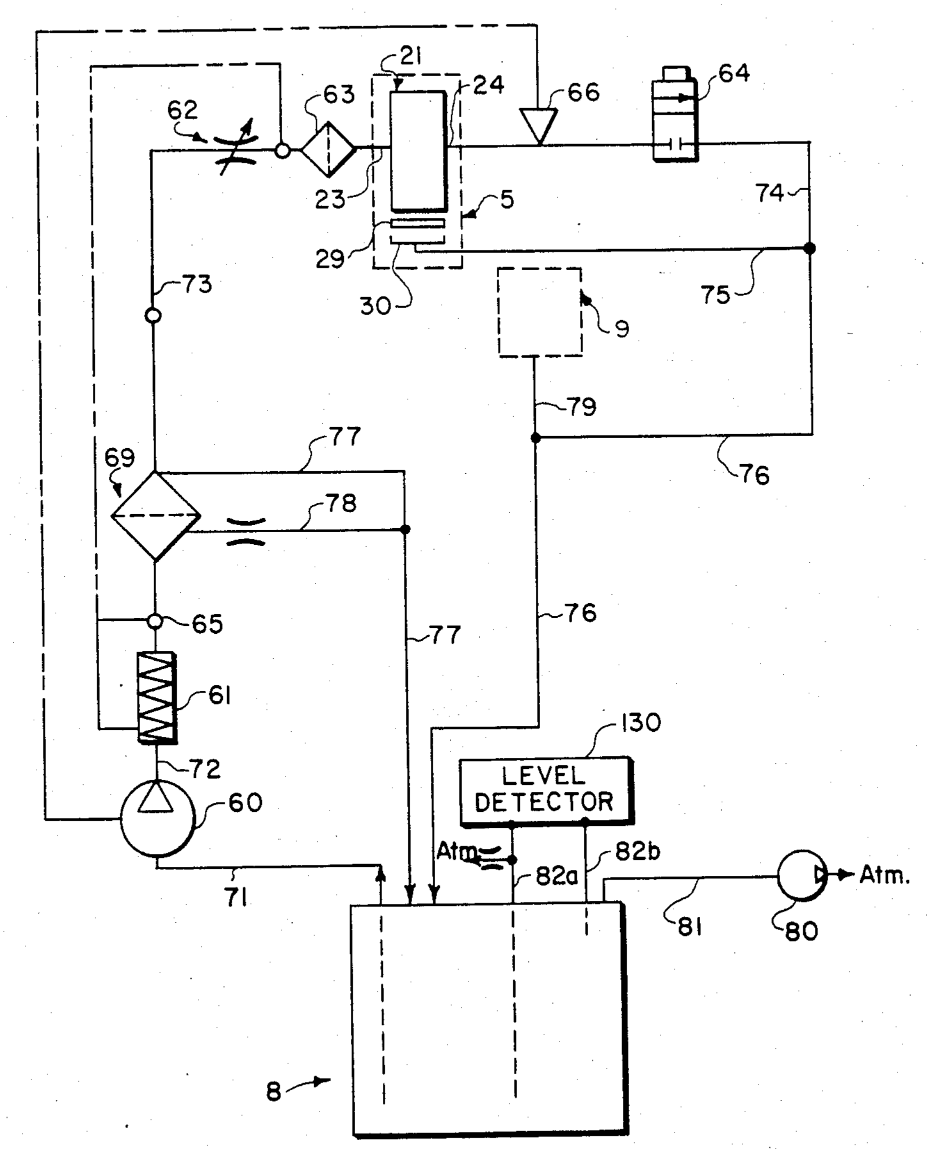
FIG. 2 is a schematic illustration of one preferred continuous ink jet printer fluid handling system with which the present invention is useful.

Referring to the schematic diagram of FIG. 2, the print head assembly 5 includes an upper portion and a lower portion. The upper portion can include a print head body 21 having an inlet 23 for receiving ink. The body 21 can comprise a passage leading to a print head cavity, the orifice plate structure of the printer (not shown) and the print head outlet 24. The upper print head portion also includes a suitable transducer means (not shown) for imparting mechanical vibration to the body. Such transducer can take various forms known in the art for producing periodic perturbations of the ink filament(s) issuing from the orifice plate to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982 in the name of Hilarion Braun; however, a variety of other constructions are useful in accord with the present invention. Preferred orifice plate constructions for us in accord with the present invention are disclosed in U.S. Pat. No. 4,184,925; however, a variety of other orifice constructions are useful.

The lower portion of print head assembly 5 includes a charge plate 29 constructed to impart desired charge upon ink droplets at the point of filament break-up and a drop catcher 30 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation ink filaments are ejected through the orifices in plate and, under the influence of the transducer on body, break up into streams of uniformly sized and spaced droplets. The charge plate is located proximate the zone of filament break-up and is adapted to selectively charge or not charge each droplet in each of the streams in accordance with information signals respectively transmitted to the various charge sectors of the charge plate. The charged droplets are deflected to catcher 30 for recirculation back to the ink print head, while uncharged droplets pass on to the print substrate.

One exemplary ink supply and circulation system in accord with the present invention is shown in FIG. 2 and includes various ink conduits or "lines" which form the ink circulation path. Specifically, pump inlet line 71 extends from ink supply cartridge 8 to the inlet of pump 60, pump outlet line 72 extends between pump 60 and main filter 69, head supply line 73 extends from main filter 69 to the print head inlet and head return line 74 extends from the print head outlet to a junction between catcher return line 75 and the main ink return line 76. The main return line 76 is also connected to home station return line 79. An air bleed line 78 and an ink bypass line 77 extend from main filter 61 back to cartridge 8. A vacuum pump 80 is coupled to the cartridge interior via conduit 81 to facilitate ink return via line 76. As will be clear from the subsequent description, the present invention is not limited to use with the particular ink circulation line arrangement shown in FIG. 2. Other elements of the FIG. 2 embodiment such as ink heater 61, variable flow restrictor 62, final filter 63, head return valve 64, temperature sensor(s) 65 and pressure sensor 66 are not necessary for the practice of the present invention, but can be usefully incorporated with it.

Figure 3:
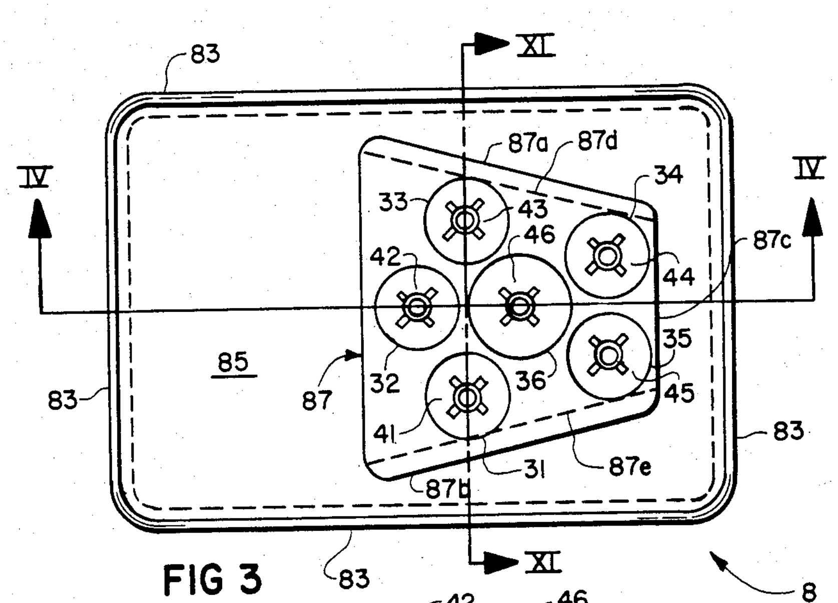
FIG. 3 is a top view of one ink cartridge embodiment of the present invention.
Figure 4:
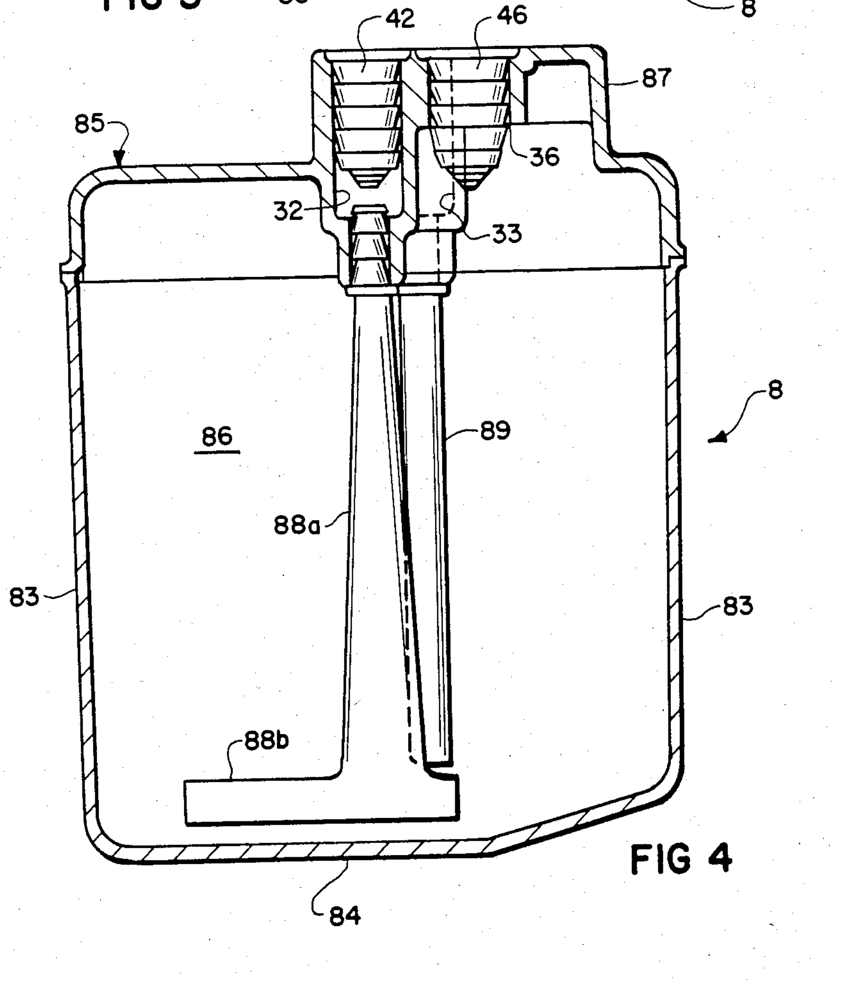
FIG. 4 is a cross section along the lines IV—IV of FIG. 3.
Figure 5:
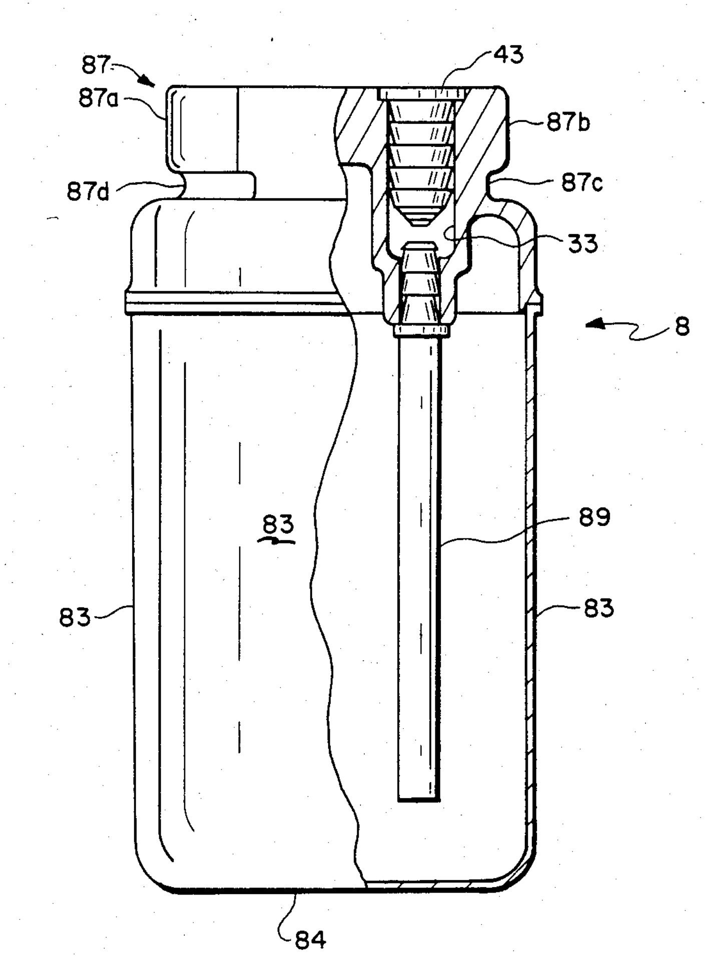
FIG. 5 is a side view partially in cross section of the cartridge shown in FIG. 2.

Referring to FIGS. 3, 4 and 5, the cartridge 8 is constructed to be readily inserted and removed, as a unit, from operative relation with lines of the ink circulation system. More particularly, the cartridge 8 comprises side walls 83, bottom wall 84 and a top wall 85 which define an enclosed ink supply/return reservoir 86. The top wall 85 of the cartridge has a raised portion denoted generally 87 in which are formed ports 31, 32, 33, 34, 35 and 36 which each provide a fluid path from the cartridge exterior to the supply/return reservoir 86. Those ports respectively have mounted therein valve members 41, 42, 43, 45 and 46 which are biased to a closed position.

Figure 6:
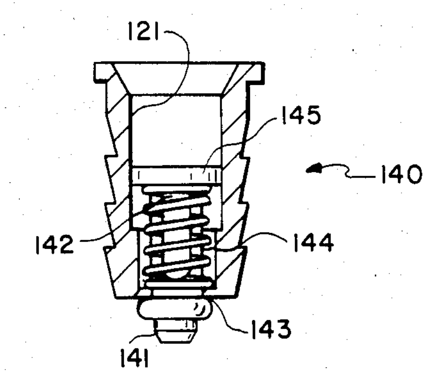

A representative cartridge valve 140 is shown in more detail in FIG. 6. The cartridge valve members each have female portions 121 that are adapted to interfit with a male portion of a conduit terminal (to be described subsequently) to provide a coupling that effects a sealed passage into the cartridge. Each cartridge valve includes a closure portion that is biased to a normally closed position by resilient means, e.g. spring 142. The closure portion 141 is movable against the valve's self-bias to a position that opens the lower valve orifice 143, and thus its respective cartridge port, for fluid communication with cartridge interior. The closure member 141 is integrally coupled to a stem portion 144 and an apertured flange 145 which are located within the passage through the valve body.

The cartridge embodiment shown in FIGS. 3–5 is designed to cooperate with the fluid system shown in FIG. 2. Thus, port 32 is intended for coupling to pump inlet line 71, port 36 is intended for coupling to return line 76, port 35 is intended for coupling to bypass and air bleed return line 77, port 34 is intended for coupling to vacuum line 81 and ports 33 and 34 are intended for coupling to level sensor lines 82*a* and 82*b*. The cartridge interior includes an ink supply conduit 88*a*, coupled to port 32, which extends to a location proximate the bottom wall 84 and terminates in a filter section 88*b*. An ink level sensing tube 89 is coupled to port 33.

To accomplish facile insertion and removal of the cartridge 8 into and from operative relation with the printer's fluid handling system, the cartridge and interface structure of the printer are provided in accord with the present invention, with a number of cooperative features. Thus each of the apparatus conduits that are to be coupled to the cartridge 8 have male terminals that are constructed to interfit in a sealed fluid communication with the valved ports of the cartridge. Specifically, terminal 102 (for supply conduit 71) is adapted to mate with valved port 32, terminals 101 and 103 (for sensor conduits 82*a* and 82*b*) are adapted to mate with valved ports 31 and 33, terminal 106 (for return conduit 76) is adapted to mate with valved port 36, terminal 104 (for vacuum conduit 81) is adapted to mate with valved port 34 and terminal 105 (for bypass conduit 77) is adapted to mate with valved port 35.

Figure 7:
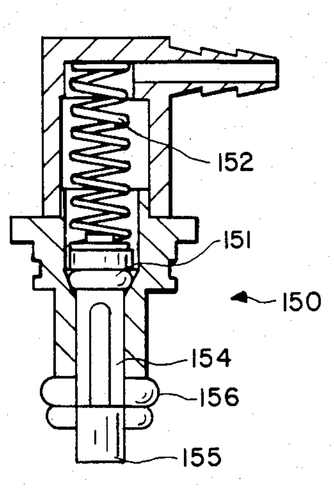
FIGS. 6–8 are cross-sectional views of the valve structure of the FIG. 2 cartridge and of the cooperative printer apparatus terminal structure.
Figure 8:
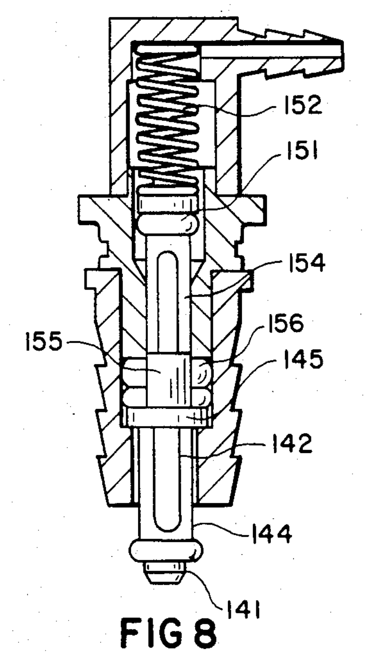

A representative terminal construction is shown in more detail in FIG. 7. Thus, the terminal 150 also is provided with a closure portion 151 that is biased by resilient means, e.g. spring 152, to a normally closed condition. The portion 151 is integrally coupled to stem portion 154 and an apertured abutment portion 155. The closure portion 151 is actuatable to an open condition by pressure engagement of the abutment portion 155 with the flange portion 145 of its cooperative valved port in cartridge 8. Similarly, the closure portion 141 of cartridge valve member 140 is actuatable to an open condition by such engagement. The coupled engagement of valve 140 and terminal 150 is shown in FIG. 8. The terminal portion 150 includes sealing ring 156 that is adapted to interfit in the passage of valve 140.

In accord with the present invention the proper alignment of the respective cartridge valves and conduit terminals and their engagement and disengagement are effected by cooperative alignment structures on the cartridge and on the cartridge interface portion of the printer's cartridge housing. Specifically, the raised portion 87 of cartridge 8 includes longitudinal alignment edges 87*a* and 87*b* which taper together in the direction of an abutment edge 87*c*. In addition, each of the longitudinal edges is provided with a recessed lifting groove, respectively 87*d* and 87*e*.

Figure 9:
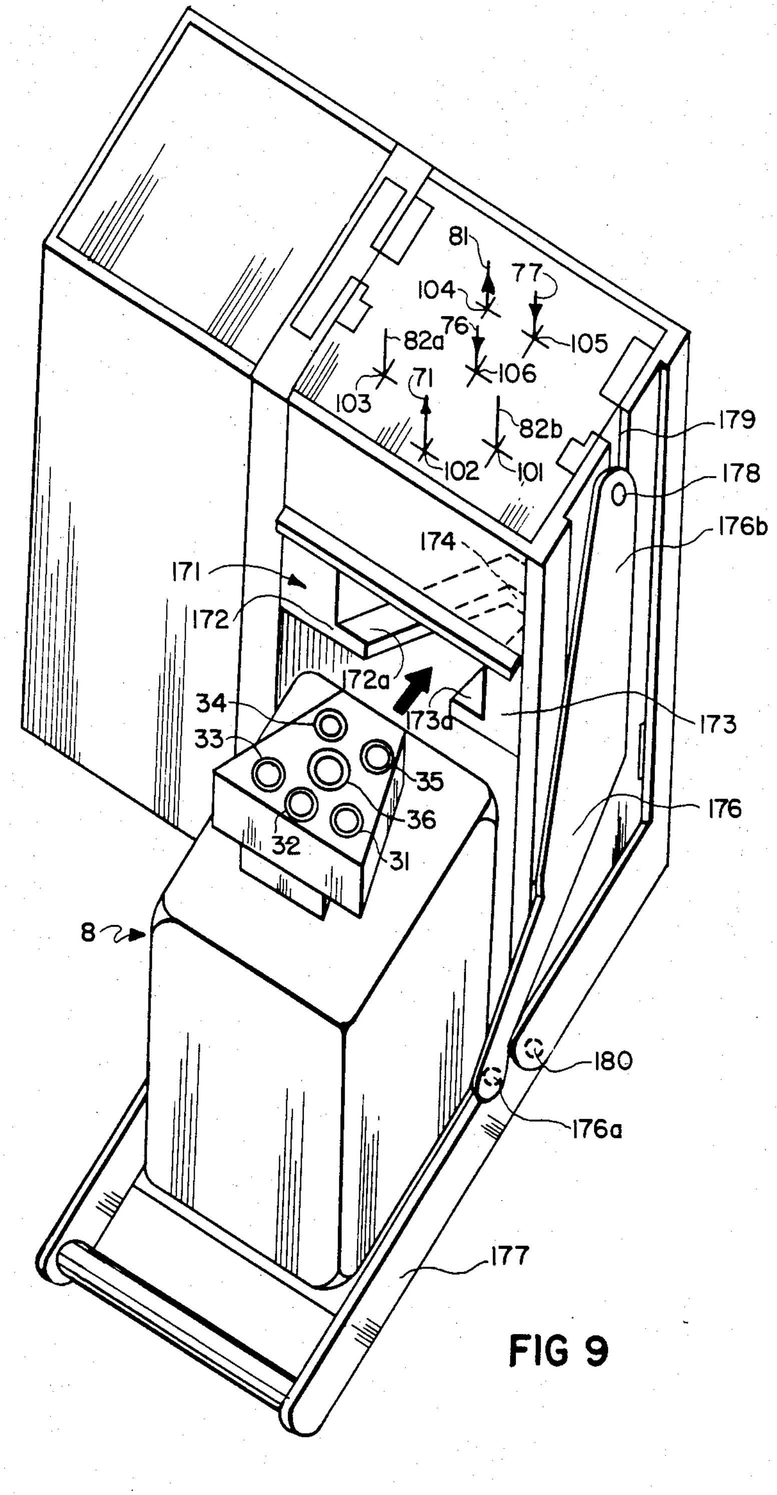
FIGS. 9 and 10 are perspective views of the apparatus cartridge receiving and interface construction of one printer embodiment according to the present invention.
Figure 10:
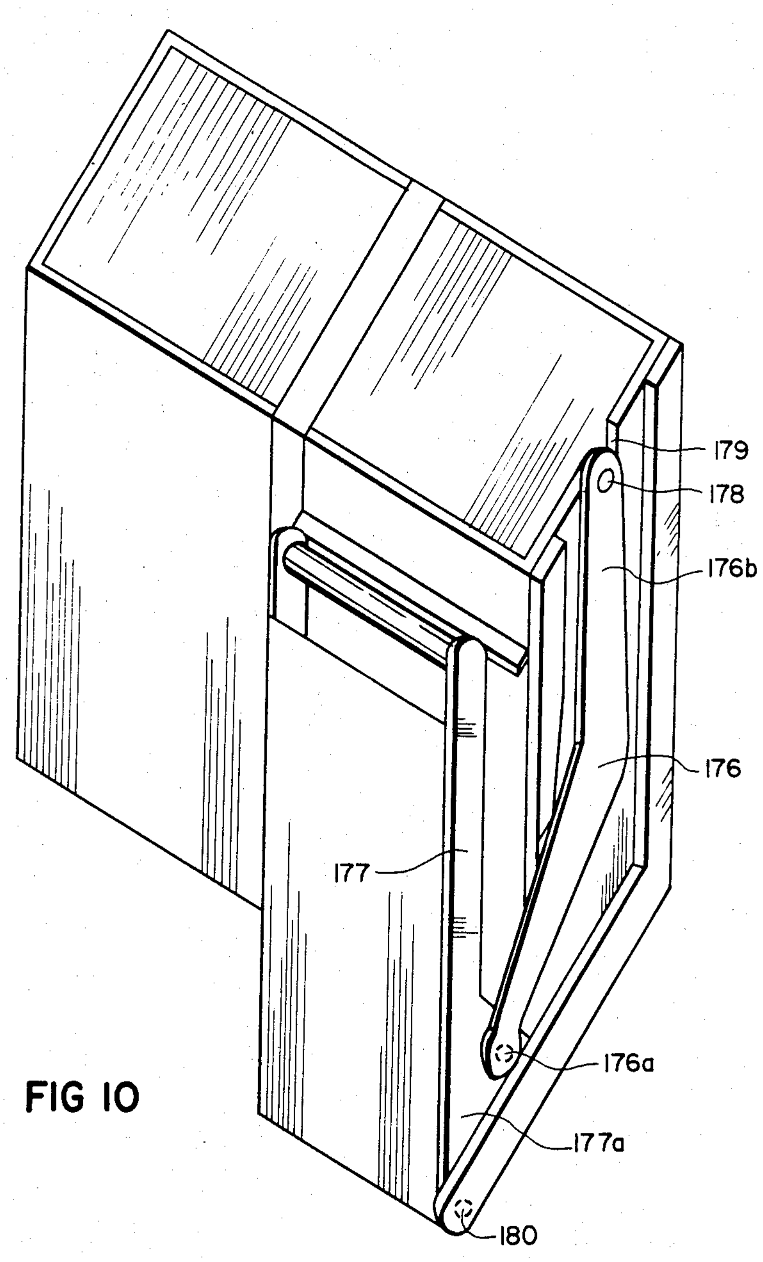

The cartridge interface construction of the printer is provided in cartridge housing 120 of the printer apparatus, see FIGS. 1, 9 and 10. The conduit terminals are located in a top wall 170 of the housing with their cooperative coupling structures facing downwardly so as to be engageable with their respective mating ports in the top of a cartridge that is inserted into the housing. In order to properly align the ports and valve structure of an inserted cartridge with proper terminals and related valve structure of the printer, an alignment and engagement member 171 is supported within the housing in a position for engaging the guide and abutment edges of an inserted cartridge. Thus the member 171 includes alignment and engagement arms 172 and 173 that diverge outwardly from a stop surface 174, to an extent that conforms to the inward taper of the sides of the raised portion of cartridge 8. The arms 172, 173 are spaced apart a distance such that when the abutment surface of a cartridge has been moved into contact with stop 174 of the alignment and engagement member (as guided by the cooperation of edges 87*a* and 87*b* with the arms 172 and 173), the flanges 172*a* and 172*a* of the arms are snugly within the recesses 87*d* and 87*e* of those cartridge edges.

When a cartridge has been inserted in the above-described manner, it is properly aligned vis-a-vis the conduit terminals and means for lifting the cartridge into engagement with the terminal can be actuated. One preferred device for effecting this lifting engagement is, as shown in FIGS. 9 and 10, a toggle linkage 176 coupling housing door 177 of the printer's cartridge housing to reciprocatory drive 178, 179 for the member 171. As shown, the toggle linkage 176 is coupled to a flange 177*a* of the door at pivot 176*a* and is adapted to raise the lift arms in response to door closure on its pivot 180 and lower the lift arms in response to the opening of the door. The toggle linkage has an over-center position slightly beyond the uppermost movement of the door movement and thus the uppermost movement of the lift arms.

In operation, a cartridge that has been guided to an aligned position is raised in response to door closure by the raising of linkage 176 due to its cupling at 176*a* with door 177. The female coupling portions of the cartridge ports are thus moved into mating engagement with the male coupling portions of the conduit terminals. The upward movement of the cartridge causes mutual opening of both the cartridge and terminal valves and the final over-center movement of the toggle linkage allows the cartridge to back-off slightly to a position where both valve sets are open. The normal bias of the valve sets retains the toggle linkage in its over-center position which is the normal operative position for printer operation. When it is desired to remove a cartridge the door is opened, moving the cartridge initially upward to pass the over-center position of the toggle linkage and then moving the lift arms downwardly to disengage the cartridge ports from the conduit terminals. This disengagment effects immediate closure of both valve sets so that no ink leakage can occur from either the cartridge or the printer conduits. An empty cartridge can then be removed and replaced with a full cartridge.

Figure 11:
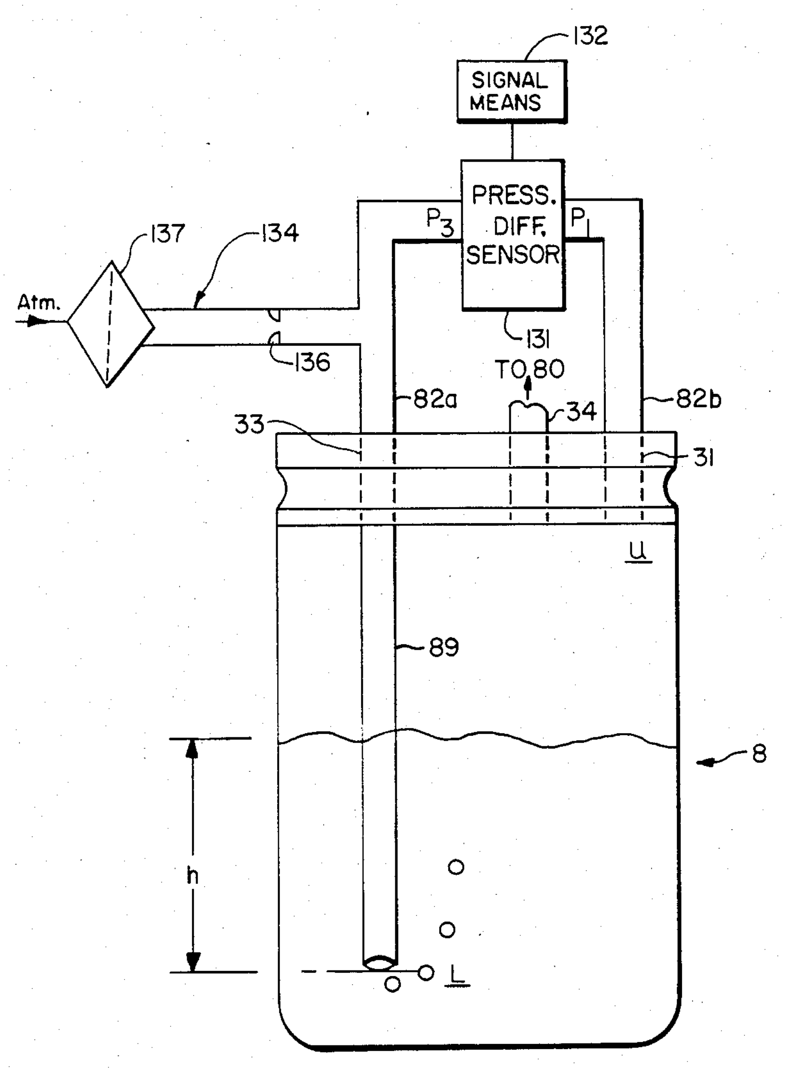
FIG. 11 is a schematic diagram (including a cartridge cross section portion such as along IX—IX in FIG. 3) that is useful in explaining the operative principles of the present invention.

Referring now to FIGS. 2 and 11, exemplary cartridge and printer features, that provide for ink level detection in accord with the present invention will be described. FIG. 11 comprises a schematic illustration of such cartridge structure which corresponds generally to a section through cartridge 8 along lines XI—XI of FIG. 3. Although the details of the valved cartridge ports and valved conduit terminals are not shown in detail, it will be understood that the coupling structure previously described or other coupling structure can be utilized.

As shown in FIG. 11, the cartridge 8 includes first and second detection ports 31 and 33 that are respectively coupled (when a cartridge has been inserted into an operative printing condition) with level sensor lines 82*b* and 82*a*. The detection port 31, when opened by cooperation with the terminal of sensor conduit 82*b*, is adapted to transmit a representation of the fluid pressure in an upper region U of the cartridge, which is above the ink-full level. The detection port 23, when opened by cooperation with the terminal of sensor conduit 82*a* is adapted to transmit a representation of the fluid pressure at a lower region L of the cartridge 8. For this purpose the cartridge 8 comprises a detection tube 89 which extends from port 33 to the lower region L. The location of region L, and thus the length of tube 89 to locate its open lower end at the region, is selected in accord with the present invention in view of the level of ink within the cartridge (when positioned in its operative orientation) at which cartridge replacement should be effected. That is, the open end of tube 89 should be below the cartridge's ink-replacement level (i.e. the level of ink within the cartridge at which a signal indicating that cartridge replacement should be effected, is desired).

The cooperative low ink level detector 130 within the printer can include a pressure difference sensor 131 and signal means 132. Sensor 131 can comprise a pressure differential sensor of the kind adapted to sense the pressure differential between two discrete zones therein. For example, such a sensor can comprise a flexible membrane separating the two discrete zones and an electro-mechanical transducer adapted to actuate a signal means 131, in correspondence the degree of flexure of the membrane (or a predetermined extent of membrane movement) as caused by the pressure differential thereacross. One preferred sensor is Model MPL-501-G available from Micro Pneumatic Logic Co., Ft. Lauderdale, Fla. Other sensor structures that provide a signal of a predetermined pressure differential between two detection regions can be utilized.

As shown in FIGS. 2 and 11, the printer's level detection structure also comprises detection lines **82*a* and 82*b* which are respectively coupled to different discrete zones of sensor 130. Conduit 82*a* is also coupled to a flow-restricted atmospheric vent conduit 134, which can be a vent line having a restriction orifice 136 and an inlet filter 137**.

The level detection system formed by the cooperation of the printer and cartridge structure just described functions quite simply, i.e. when the ink within the cartridge has been used to a predetermined "low level", pressure sensor 131 actuates signal means 132 to sound, display and/or otherwise indicate cartridge replacement is required. For example, the printer can be signalled to shift to a standby mode and display a low ink level warning. How this structurally and functionally simple operation occurs will be explained with reference to FIG. 11.

Thus, sensor 130 will sense the difference between the pressures $P_1$ and $P_3$ (see FIG. 11). Pressure $P_1$ is substantially constant and representative of the negative pressure at the region U within the cartridge 8. Pressure $P_3$ varies with the liquid head above the region L within cartridge 8 and can be stated generally as:

$$P_3 = P_1 + \rho gh + \frac{Q8ul}{\pi R^4}$$

wherein: P is the ink density, g is the force of gravity, h is the level of ink above the end of tube 89, Q is the air flow rate through conduit 134, u is the air viscosity , l is the length of tube 89 and R is the radius of tube 89.

In accord with the present invention the contribution to pressure condition of $P_3$ by the air from atmosphere into the cartridge is made arbitrarily small so that:

$$P_3 \simeq P_1 + \rho gh$$

Because the ink density and gravity will remain constant, the pressure differential $P_3-P_1$ (which is sensed by the sensor 130) will vary substantially entirely with the liquid ink head h, i.e. $P_3-P_1 \simeq kh$, where k is the constant $\rho g$.

The rate of atmospheric air flow into the cartridge through tube 89 is selected in accord with the invention to be sufficient to insure that ink does not enter the tube 89 (which would cause variations in the pressure differential $P_3-P_1$); but small enough to be negligible in its effect in varying the pressure $P_3$ substantially from the condition at region L. As one skilled in the art will readily understand, this is accomplished by selection of the size of restriction 136 in conduit 134 and of the radius for tube 89.

In one preferred embodiment with a cartridge of dimensions substantially shown in FIGS. 3-5, a highly useful detection system has been incorporated by using a tube 89 having a diameter of 0.125 inches, a tube 89 length (measured from the bottom surface valve in port 33) of 2.58 inches and a diameter for orifice 136 in the vent conduit 134 of 0.0024 inches. With this system, the pressure $P_3$ with a full tank condition is approximately 3 inches of water and the pressure $P_3$ at a refill condition is approximately 0.2 inches of water. The aforementioned pressure sensor (Model MPL-501-G) has been preset by the supplier to actuate its switch at 0.2 inches of water.

Other constructions for implementing the concepts of the present invention will occur to those skilled in the art. For example, the port 34 can be eliminated and the conduit **82*b* coupled to the vacuum source to effect both the detection and evacuation functions. However, the FIG. 11 embodiment is preferred as providing an apparatus signal that indicates that a cartridge has not been coupled to the printer. Thus in the FIG. 11 embodiment, with conduits 82*a* and 82*b*** closed by their valve structure, the pressure sensor will detect no differential and signal a refil condition.

The invention has been described in detail with particular reference to preferred embodiments thereof, but it will be understood that variations and modifications can be effected within the spirit and scope of the invention.

What is claimed is:

1. Ink jet printing apparatus, adapted for using an ink supply/return cartridge and having (i) a print head assembly, (ii) ink supply means for providing ink from such cartridge to said assembly and (iii) ink return means, including means to induce a negative pressure within such cartridge and an ink return conducit, an improved level detection construction for cooperating with such a cartridge, including (a) means for sensing and signalling a predetermined pressure difference between first and second pressure regions;

(b) first conduit means connectible to a first port of such cartridge for transmitting a representative of the pressure within an upper, evacuated cartridge region to said sensing means; and (c) second conduit means connectible to the upper port of a cartridge tube for transmitting a representation of the pressure at a lower port of such cartridge tube, said second conduit means including a branch passage to a source of atmospheric pressure and flow restrictor means in such branch passage.

2. The invention defined in claim 1 wherein said flow restrictor is constructed to allow an air flow into such cartridge tube at a rate that does not significantly change the pressure representation transmitted from the lower part of such cartridge tube.

3. Ink jet printing apparatus of the continuous type, said apparatus comprising:

(a) print head means, including a catcher, for selectively directing ink droplets to a print medium or said catcher;
(b) a substantially enclosed ink reservoir;
(c) means for evacuating air from an upper portions of said reservoir;
(d) ink supply means, including pump means and supply conduit means, for supplying ink from a lower portion of said reservoir to said print head means;
(e) return conduit means for returning ink from said catcher to said reservoir;
(f) means for sensing and signalling the pressure difference between first and second pressure regions;
(g) first detection conduit means coupling said upper portions of said reservoir to said sensing means;
(h) second detection conduit means coupling said lower portion of said reservoir to said sensing means; and
(i) flow restriction means coupled to said second detection conduit means for allowing restricted air flow from the reservoir exterior into said lower reservoir portion.

4. The invention defined in claim 3 wherein said reservoir comprises a cartridge with detachable couplings respectively to said supply conduit means, said return conduit means, said evacuating means and said first detection conduit means, said cartridge including a sensor tube which is detachably couplable to form a portion of said second detection conduit means.

5. For use with continuous ink jet printing apparatus of the type having:
(a) print head means, including a catcher, for selectively directing ink droplets to a print medium or said catcher;
(b) means for evacuating air from an ink reservoir;
(c) ink supply means, including pump means and supply conduit means, for supplying ink from an ink reservoir to said print head means;
(d) return conduit means for returning ink from said catcher to such an ink reservoir;
(e) means for sensing and signalling the pressure difference between first and second pressure regions;
(f) first detection conduit means for coupling an upper portion of such ink reservoir to said sensing means;
(g) second detection conduit means coupling such reservoir to said sensing means; and
(h) a flow restriction means for allowing restricted air flow into said second detection conduit means, an ink reservoir cartridge comprising: (i) a reservoir housing enclosing a supply of ink; (ii) detachable couplings for respectively connecting the reservoir interior to said supply conduit means, said return conduit means and said evacuating means, (iii) means for detachably coupling said first detection conduit means to an upper portion of said reservoir housing; and (iv) a sensor tube extending from the cartridge top to a lower portion of said reservoir housing and being detachably couplable to form a portion of said second detection conduit means.

* * * * *